UNITED STATES PATENT OFFICE.

WILLIAM GREEN, OF ST. LAWRENCE, COUNTY OF KENT, ENGLAND.

MANUFACTURE OR TREATMENT OF SOAP.

SPECIFICATION forming part of Letters Patent No. 259,755, dated June 20, 1882.

Application filed January 10, 1882. (No specimens.) Patented in England June 18, 1881, No. 2,682.

*To all whom it may concern:*

Be it known that I, WILLIAM GREEN, a subject of the Queen of Great Britain, residing at St. Lawrence, in the county of Kent, England, have invented new and useful Improvements in the Manufacture or Treatment of Soap, (for which I have obtained a patent in Great Britain, No. 2,682, bearing date the 18th June, 1881, and sealed November 22, 1881;) and I do hereby declare that the following is a full, clear, and exact description of the invention, which will enable others skilled in the art to which it appertains to make and use same.

One object of this invention is the admixture with soaps made by the ordinary processes of less expensive ingredients than those of which such soaps are made, whereby additional weight and bulk may be obtained without materially detracting from their detergent or cleansing properties. Soluble glass, liquid quartz, or the aqueous solution of any of the chemical or commercial forms of silicate of soda or potassa possess powerful detergent properties, and are now largely used in the manufacture of soap. By this invention, however, I use them in a different manner to that heretofore employed, and by so doing can apply them to soaps in which they are not commonly used. It is a fact, too, not perhaps generally known, that petroleum, shale-oil, and other mineral oils, while difficult to saponify, possess considerable detergent and cleansing properties, and are at the same time powerful disinfectants. These, therefore, I also largely use, either with or without silicate of soda or potassa.

In carrying into effect this invention I proceed as follows: The petroleum or other mineral oil to be used is first boiled with water in a close vessel, so as to recover the spirit and throw off much of the unpleasant smell common to such oils. It is then run into a tank containing sea-weed or other products or matters containing similar properties and allowed to remain for some hours, or even days, if convenient. To each hundred-weight of the mineral oil I then add from five to ten per cent. of a saturated alcoholic solution of chloride of potassium and caustic soda and well agitate for some hours. Add to this five per cent. of animal or vegetable oil or fat, or about ten per cent. of recovered grease and well mix. Boil in two to three times its weight of water a silicate of soda or potassa, using one hundred-weight of the silicate to each hundred-weight of the oil under treatment. When the silicate is thoroughly boiling add thereto the oil, prepared as before described, and well mix by stirring. The saponaceous compound or matter thus produced may be used in any convenient manner in the manufacture or treatment of soap. In some cases I dispense with the silicate and use instead thereof a strong lime-water or a caustic-soda lye, the treatment in other respects being the same as that hereinbefore described. Good results may be obtained by adding to the saponaceous compound, while in a boiling state, about one-fourth of its weight of Castile or other soap. I prefer to apply the soap in thin flakes, either from rollers or from a scraping or cutting machine.

Although the use of mineral oils treated as described and in the manner described is a primary feature of the invention, I have discovered that certain soaps—as Castile or Marseilles soap—may be increased in weight and bulk without materially detracting from their cleansing properties by the addition in a novel manner of silicate of soda or potassa, with a certain proportion of water, either with or without the admixture of oil or fat, although I prefer the addition of a small percentage of oily or fatty matter with the silicate. In carrying into effect this part of the invention, to each hundred-weight of the silicate add (by preference) about five pounds of olive-oil, or a larger percentage of cotton-seed oil, and let it stand till the oil is saponified, or nearly so. Add to this about two to three times its weight of water, well boil, and then add the soap thereto in any convenient manner, either in the finished or the unfinished state. The proportion of soap to be added to the silicate will vary according to the quality required in the final product. I have found equal weights of silicate and soap to give good results.

I also prepare a fatty material suitable for soap-making and for other uses by the admixture of petroleum, shale-oil, or other mineral oils treated with a saturated alcoholic solution of chloride of potassium and caustic soda, as before described, with tallow or other fat, grease, or oil, and use the same for making soap or for lubricating, lighting, or other purposes. In carrying into effect this part of the invention any of the known processes for soap-making may be employed; but I prefer the following: The mineral oil is subjected to the action of sea-weed or equivalent matters and otherwise treated with a saturated alcoholic solution of chloride of potassium and caustic soda, as hereinbefore described. To each hundred-weight of the oil so treated add from eight to ten pounds of double refined ninety-eight per cent. caustic soda in three to four times its weight of water (or a lye of similar strength) and agitate for some hours. To each hundred-weight of the mineral oil used then add from ten to twelve pounds of olive-oil and about twenty pounds of cotton-seed oil, also the discharged lye from a previous boiling, and agitate occasionally till the lye and oil combine and the oil ceases to rise to the top. This, as a rule, will take some days. The whole is then to be well boiled, and in resting or cooling any oil that may rise to the top is to be removed. The boiling is to be repeated and the fatty or oily matter removed from the top until it ceases to appear. On cooling a portion of the lye used will separate, and in some cases a sediment will form which should also be removed and reboiled with a weak lye.

Another mode is as follows: To each hundred-weight of mineral oil treated with sea-weed and with a saturated alcoholic solution of chloride of potassium and caustic soda, as hereinbefore described, add twenty pounds of olive-oil and well mix by stirring. For each hundred-weight of oil under treatment prepare fifty pounds of lye with double refined caustic soda to mark 16° Baumé, an equal quantity at 20°, and an equal quantity at 28°. Add the first lye, agitate occasionally to promote saponification, and on the following day boil. When cold run off the discharged lye and add the second, again stirring occasionally, and then again boiling for several hours. Then let it rest and again run off the discharged lye, after which add the third lye, stir till the whole is thoroughly mixed, again boil for several hours, then turn off the heat, and after resting a few hours run off the remainder of the lye. As in the former process, the oil or greasy matter which on resting rises to the top should be removed. In each case the lye which separates is to be utilized in future boilings.

Oils obtained by the before-mentioned combinations and treatment will not flash except at a high temperature, are comparatively free from smell, and may be used for lighting, lubricating, and other purposes.

Soaps made according to this invention, and in all cases where mineral oils are used in their manufacture, may be improved by an admixture of a saturated alcoholic solution of chloride of potassium and caustic soda, which may be applied by grinding, or while in a melted state, or otherwise.

The proportions of animal or vegetable oil or fat to the mineral oils treated as hereinbefore described may be considerably varied, according to the quality of the soap required. Tallow or other fat is used instead of oil for some soaps. In some cases, too, the animal or vegetable oil or fat may be dispensed with, or partially so, and a resinous or other saponifiable matter be used in lieu of such oils or fat.

Silicates of soda or potassa may be used with soaps made according to this invention, either by the ordinary methods or those hereinbefore described.

Soaps made according to this invention may be used alone or combined by grinding or otherwise with soaps possessing higher lathering properties.

I have found Castile or Marseilles soaps to answer well for the purposes of this invention; but other soaps may be used.

Extract of sea-weed, or sea-weed reduced to a finely-divided state, is in some cases added to soaps made according to this invention for the purpose of increasing the lathering properties; also a small percentage of boracic acid.

When using resinous matters I prefer to mix them with a little oily or fatty matter—say about thirty per cent.—and to grind them to a paste. To one hundred-weight of the resinous paste add, by grinding or stirring, five hundred-weight of mineral oil, treated as hereinbefore described, with a saturated alcoholic solution of chloride of potassium and caustic soda. To this is added a strong lye, as before described, and the whole is agitated until the oil ceases, or nearly ceases, to rise to the top. In this state it may be mixed, by grinding or otherwise, with other soaps, or it may be boiled and otherwise treated according to the modes hereinbefore described when using oily or fatty matters for producing saponaceous compounds and soaps.

The several proportions and modes of treatment hereinbefore described have been found to answer well; but I do not confine myself thereto, as they may be considerably varied without departing from the principle or objects of this invention.

Oils obtained from schist, asphaltum, and similar matters may also be used, as may tallow, lard, or other fat or grease, in lieu of olive-oil, cotton-seed oil, or other animal or vegetable oils, as mentioned.

Should any taint of smell from the mineral or other low-priced oil used be perceptible in the final processes, use a little perfume or other counteracting agent, or grind the soap between rollers, thus subjecting it in thin sheets to the action of the atmosphere.

Having now set forth the nature and objects of my said invention and explained the manner of carrying the same into effect, I wish it to be understood that under the above in part recited Letters Patent I claim—

1. The described soap, made from mineral oils which have previously been treated with an alcoholic solution of chloride of potassium and caustic soda, then with about ten to twenty per cent. of animal or vegetable oil or fat, and the admixture of the soap so made with Castile or similar soap, substantially as described.

2. The soap described, made from mineral oils which have previously been treated with sea-weed, then with about five to ten per cent. of vegetable oil or fat, either with or without the addition to such oils of a saturated alcoholic solution of chloride of potassium and caustic soda, and the admixture of soaps as so made with Castile or other soap possessing high lathering properties, substantially as described.

WILLIAM GREEN.

Witnesses:
G. F. REDFERN,
A. ALBUTT.